May 4, 1943.

Z. E. HOUSE 2,318,313

SPEED INDICATING DEVICE

Filed Oct. 15, 1941

Inventor
Zachariah E. House.
By Munn, Liddy, Glaccum & Kane
Attorneys

Patented May 4, 1943

2,318,313

UNITED STATES PATENT OFFICE 2,318,313

SPEED INDICATING DEVICE

Zachariah E. House, Cass Lake, Minn.

Application October 15, 1941, Serial No. 415,131

5 Claims. (Cl. 177—311.5)

This invention relates to speed indicating devices.

An object of the invention is the provision of a unit which is adapted to be incorporated in a hub cap of a vehicle and which is adapted to operate a switch for closing a circuit that controls an indicator of any type at the dash of the automobile for warning the driver that he is exceeding a predetermined speed.

A further object of the invention is the provision of an operating means for a warning signal normally placed adjacent the dash of the automobile, in which a governor is adapted to release a plunger for closing a circuit in which the indicator is embodied, the switch being connected with wires which pass through a hollow axle with the hollow axle passing through the center of a hub cap and being maintained stationary during rotation of the hub cap.

This invention will be best understood from a consideration of the following detailed description, in view of the accompanying drawing forming a part of the specification, nevertheless, it is to be understood that the invention is not confined to the disclosure, being susceptible of such changes and modifications as define no material departure from the salient features of the invention as expressed in the appended claims.

Figure 1:
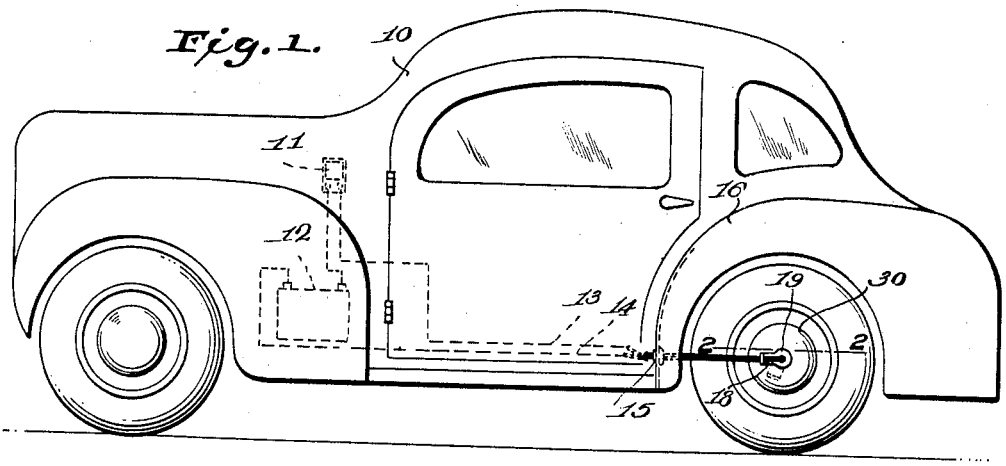
Figure 1 is a side view in elevation of an automobile showing my speed indicator attached to one of the rear wheels.

Referring more particularly to the drawing, 10 designates an automobile having a buzzer 11 or other form of indicator near the dash of the vehicle. This buzzer is in circuit with the usual battery 12 of the vehicle or it may be in circuit with dry cells carried by the vehicle. This circuit includes wires 13 and 14 which pass through a bushing 15 carried by a rear fender 16 of the vehicle.

Figure 2:
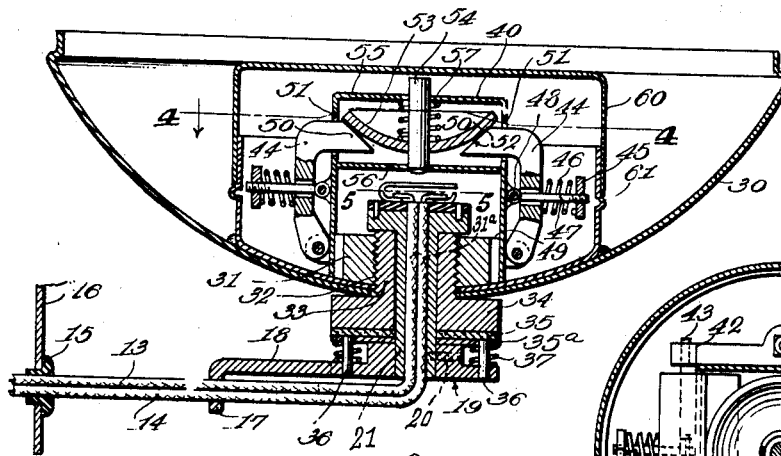
Figure 2 is a horizontal section taken along the line 2—2 of Fig. 1 showing the position of the governor and switch when the automobile is standing still.
Figure 4:
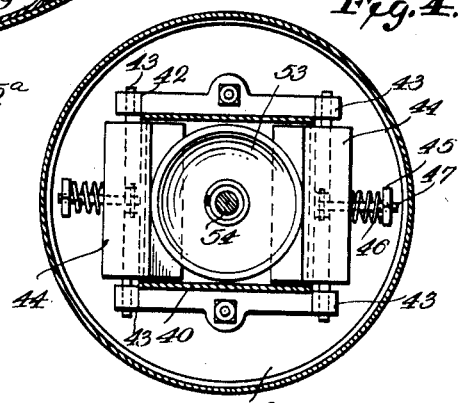
Figure 4 is a vertical section taken along the line 4—4 of Fig. 2.
Figure 5:
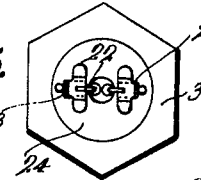
Figure 5 is a vertical section taken along the line 5—5 of Fig. 2.

As shown more particularly in Fig. 2, these wires extend through an opening in an inturned lug 17 projecting laterally from an arm 18 which is secured to or which is formed integrally with a collar secured by a pin 20 on the outer end of a hollow axle 21.

The inner end of wire 13 as shown at 22 is connected to a spring member 23 secured to an insulating plate 24 which in turn is secured to the inner enlarged end 25 of the axle 21. The spring member 23 is located outwardly and in substantially parallel relation with the plate 24 and terminates above the contact 26 which is also secured to the insulating plate 24. The enlargement 25, the hollow axle 21 and the collar 19 are held stationary because of the fact that the arm 19 is connected with the wires 13 and 14 and these wires are held stationary where they pass through the bushing 15 in the fender 16. Around this axle revolves a hub cap 30 of the usual type which is adapted to be forced into position on the wheel over the hub thereof.

A nut 31 is threaded at 32 onto a sleeve 33 which has an annular shoulder 34 in engagement at one face with the outer wall of the hub cap and at its other face in engagement with a washer 35 which is formed of felt or graphite, and which is pressed against the outer face of the annular shoulder 34 when the collar 19 is secured into place. A pair of pins 36 are mounted in the collar 19 and receive a coil spring 37 which presses against the washer 35. These springs are mounted in pockets in the collar 19 and pass through perforations in a steel washer 35a which is pressed against the washer 35.

A casing 40 is located within the cap 20 and has its inner end secured in any approved manner to the inner wall of an outer housing 41. Ears 42 project laterally from the side walls of the housing 40 and carry pintles 43 that form pivots for the outer ends of centrifugally operated arms 44. These arms are limited in their outward movement at a predetermined speed of the vehicle by means of nuts 45, springs 46 and a rod 47 pivoted at 48 on the side walls of the casing 40.

Figure 3:
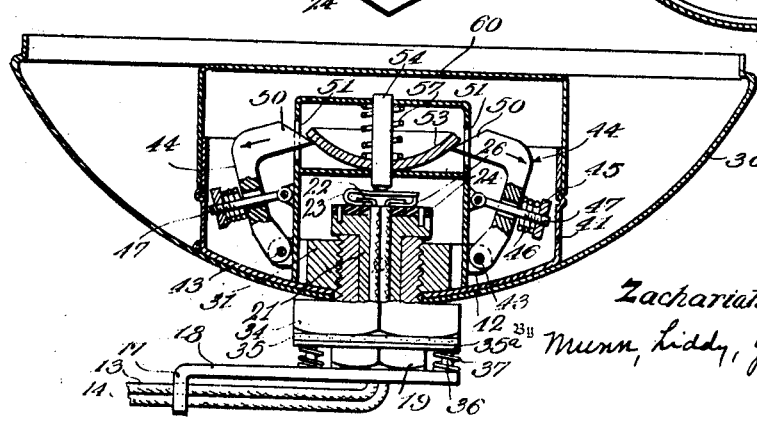
Figure 3 is a similar horizontal section showing the governor in operative position at a predetermined speed for releasing a device which closes the switch.

It will be noted from Figs. 2 and 3 that the rods 47 which are surrounded by the spring 46 and upon which the nuts 45 are screwed are received by passages 49 formed in the arms 44. Springs 46 tend at all times to move the free ends 50 of the arms 44 inwardly through openings 51 in the side walls of the casing 40 so that the inclined or cam portions 52 of the arms will engage the convex member 53.

A plunger 54 is slidably mounted in an inner wall 55 of the casing 40 and a partition 56 located within the casing. The plunger 54 is secured to the convex member 53 and is moved outwardly by a spring 57. The inner end of the plunger 54 extends beyond the outer face of the curved member 53 and is adapted to engage the spring switch arm 23 as shown in Fig. 3.

The housing 41 is provided with a cap 60 which has a neat fit with the inner end of the housing 41 and is limited to its inward movement on the housing by an annular rib 61. The housing 41 is welded or secured in any approved manner to the inner face of the hub cap 30.

The operation of my device is as follows: When the automobile is traveling at a normal speed the centrifugally operated arms 44 will remain in a position that the plunger 54 will be held out of contact with the spring switch arm 23. However, when the speed of the vehicle reaches a predetermined degree the arms 44 will move out farther from the casing 40 so that the spring 57 will force the curved member 53 inwardly and likewise the plunger 54 until the inner end of the plunger forces the spring switch arm 23 into engagement with the contact 26, whence the circuit to the buzzer will be closed and will be operated to give warning to the driver of the car that he is going beyond a predetermined speed.

The springs 46 are stronger than the springs 57 so that the plunger 54 may be operated by the spring 57 at the proper time.

It will be noted from the above construction that the operating mechanism for the buzzer 11 is incorporated within the hub cap 30 and is removed with the hub cap when the hub cap is removed from the wheel.

During the rotation of the wheel and likewise the hub cap 30 the sleeve 21 together with a collar 19 and the arm 18 will remain stationary due to the fact that the sleeve 21 will act as an axle around which the hub cap revolves. Furthermore the wires 13 and 14 in cooperation with the arm 18 will hold the collar 19 and likewise the sleeve 21 against rotation.

A set screw 31a which holds the nut 31 against rotation secures said nut to the sleeve 33. If desired a rubber cap may be placed over the parts projecting exteriorly of the hub cap to protect said parts against exposure to rain.

I claim:

1. In a speed indicating operating device for vehicles comprising a hub cap, a housing secured to the inner face of the cap, a pair of oppositely disposed weighted arms pivoted at one end on the outer walls of the housing and having the other ends thereof projecting into the housing, a curved member slidable in the housing, a spring urging the curved member into engagement with the free ends of the weighted arms, a switch adapted to be moved to closed position by the curved member when the arms are moved outwardly of the casing by centrifugal force, a hollow axle projecting through the center of the cap and carrying the switch at the inner end thereof, and wires extending between the switch and indicator, said wires passing through the hollow axle, and means connected with the axle and means for aiding in maintaining the axle stationary when the hub is revolving.

2. In a speed indicator for vehicles, an operating device for the indicator embodied as a unit in a hub cap comprising a pair of centrifugally operated arms, means pivotally mounting one end of the arms within and on the cap, a hollow stationary axle passing centrally through the cap, a switch on the inner end of the axle, a slidable member having curved portions engaging the free ends of the arms and maintaining the slidable member out of engagement with the switch, a spring urging the member towards said switch, wires extending between the switch and indicator and passing through the hollow axle, and means connected to the axle and cooperating with the wires for aiding in maintaining the axle stationary.

3. In a speed indicator for vehicles, an operating device for the indicator comprising a unit which is secured within a hub cap, a stationary hollow axle projecting outwardly from the unit and through the center of the cap, a switch carried by the inner end of said axle, a movable member, a spring urging the member into operative relation with the switch for causing closing of said switch, means having cam elements thereon, a pair of centrifugally operated arms pivoted on the cap and having free ends engaging the cam elements for maintaining the movable member out of operative engagement with the switch, wires extending between the indicator and the switch and extending through the hollow axle, means cooperating with the wire for retaining the axle stationary while the cap rotates around said axle.

4. In a speed indicator for vehicles, an operating device for speed indicator comprising a unit which is secured within a hub cap of a vehicle, a stationary hollow axle projecting outwardly from the unit and through the center of the cap, a switch carried by the inner end of said axle, a movable member, a spring urging the member into operative relation with the switch for causing closing of said switch, means having cam elements thereon, a pair of centrifugally operated arms pivoted on the cap and having free ends engaging the cam elements for maintaining the movable member out of operative engagement with the switch, wires connected between the indicator and the switch and extending through the hollow axle, means cooperating with the wires for retaining the axle stationary while the cap rotates around said axle, and means connected to the cap and providing a hub for the cap, said hub revolving around the axle.

5. In a speed indicator for vehicles, an operating device for the indicator embodied as a unit on a hub cap comprising a pair of centrifugally operated arms, means pivotally mounting one end of the arms within and on the cap, a hollow stationary axle passing centrally through the cap, a switch on the inner end of the axle, a slidable member having curved portions engaging the free ends of the arms and maintaining the slidable member out of engagement with the switch, a spring urging the member towards said switch, wires extending between the switch and indicator and passing through the hollow axle, an arm secured to the axle and projecting radially therefrom, and a lateral lug on the free end of the arm having a passage to receive the wire.

ZACHARIAH E. HOUSE.